United States Patent
Bleckert et al.

(10) Patent No.: US 7,580,367 B2
(45) Date of Patent: Aug. 25, 2009

(54) METHOD AND DEVICE FOR THE AUTOMATIC CONFIGURATION OF A GPRS TERMINAL

(75) Inventors: Peter Bleckert, Uppsala (SE); Niklas Lundin, Gothenburg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 836 days.

(21) Appl. No.: 10/513,236

(22) PCT Filed: Nov. 13, 2002

(86) PCT No.: PCT/EP02/12677

§ 371 (c)(1),
(2), (4) Date: Nov. 2, 2004

(87) PCT Pub. No.: WO03/096724

PCT Pub. Date: Nov. 20, 2003

(65) Prior Publication Data

US 2005/0117554 A1 Jun. 2, 2005

(30) Foreign Application Priority Data

May 8, 2002 (EP) .................................. 02010433

(51) Int. Cl.
*H04L 12/28* (2006.01)
*H04L 12/56* (2006.01)
*H04Q 7/20* (2006.01)
*G06F 15/177* (2006.01)

(52) U.S. Cl. .................... 370/254; 370/395.2; 370/401; 455/435.1; 709/220

(58) Field of Classification Search .................. 370/315, 370/328, 331, 338, 400–401; 455/432.1–444
See application file for complete search history.

(56) References Cited

U.S. PATENT DOCUMENTS

| 6,603,969 B1 * | 8/2003 | Vuoristo et al. ............. 455/433 |
| 6,754,482 B1 * | 6/2004 | Torabi .......................... 455/410 |
| 7,295,848 B1 * | 11/2007 | Eloranta ....................... 455/461 |
| 2002/0052965 A1 | 5/2002 | Dowling |
| 2002/0061746 A1 * | 5/2002 | Jo et al. ........................ 455/433 |
| 2004/0166839 A1 * | 8/2004 | Okkonen et al. ............. 455/419 |

FOREIGN PATENT DOCUMENTS

| DE | 10031896 C | 1/2002 |
| EP | 1011284 A | 6/2000 |
| WO | WO 9841044 A | 9/1998 |

OTHER PUBLICATIONS

European Patent Office, Internatinal Search Report for PCT/EP02/12677, dated Aug. 4, 2003.

\* cited by examiner

*Primary Examiner*—Tri H Phan
(74) *Attorney, Agent, or Firm*—Roger S. Burleigh

(57) ABSTRACT

The invention relates to a method and devices for the automatic configuration of a GPRS terminal. Therefore data relating to a terminal type and a terminal identification are stored in a device configuration register. The configuring is started by a serving GPRS support node that receives an attachment message from a terminal in combination with a subscriber identification that are not known to the serving GPRS support node.

6 Claims, 6 Drawing Sheets

METHOD AND DEVICE FOR THE AUTOMATIC CONFIGURATION OF A GPRS TERMINAL

The present invention relates to a method and a database for the automatic configuration of GPRS (General Packet Radio Service) terminals.

Data transmission in telecommunications networks for mobile telecommunication is of increasing importance. A way to transmit data in a packet switched telecommunications network is the GPRS (General Packet Radio Service). GPRS supports the transmission of data with higher data rates and a charging model related to the amount of data transmitted instead to an amount of time. A GPRS subscriber can therefore be always connected without paying for connection time. However, the configuration of terminals that are adapted to support GPRS is cumbersome, today. It demands of a subscriber to perform many steps and thus delays the use of GPRS by large scales subscribers.

It is therefore object of the invention to provide a method for the automatic configuration of terminals for GPRS.

It is advantageous that a subscriber that attaches for the very first time to a network does not have to configure her/his terminal her/himself. It is further advantageous that a subscriber who changed the terminal does not have to configure it. Further advantageous is that in the case that changes in a subscription require a re-configuration said reconfiguration is executed automatically.

DETAILED DESCRIPTION OF THE INVENTION

In the following the invention will be further described by means of examples and by means of figures. The term terminal is used for a terminal supporting GPRS.

A device configuration register is a logical node that can be implemented as a stand alone device or in an existing node. Any node that delivers an identification of a terminal type after receiving a request can be seen as a device configuration register.

In an embodiment of the invention, the delivery of an identification of a terminal type is performed by a device management system. In said embodiment the device management system can be regarded as part of a device configuration register, even though device configuration register and device management system can be implemented as stand alone devices in separate housings.

A terminal type is a group of terminals that require the same configuration message.

Figure 1:
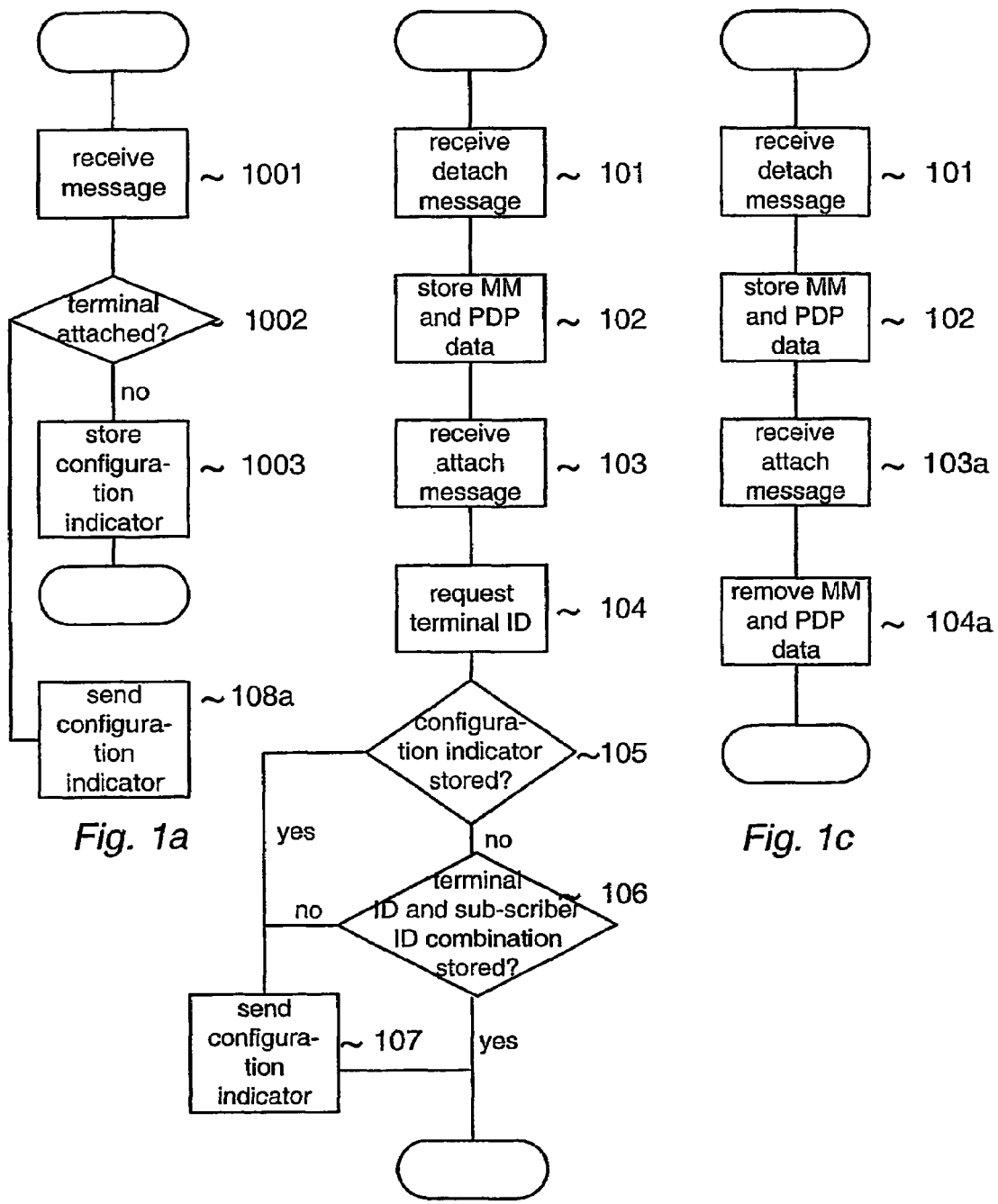
FIG. 1a depicts a method for a SGSN according to the invention.
FIG. 1b depicts a further method for a SGSN according to the invention.
FIG. 1c depicts a third method for a SGSN according to the invention.

FIG. 1a depicts a flowchart of a method executed by a GPRS support node according to the invention. In a first step 1001, the GPRS support node receives message comprising at least an identification of a terminal. The message indicates that the identified terminal has to be configured. Such messages are sent for example by a home location register, or from operation and maintenance nodes if subscriber data are modified.

In a next step 1002, the GPRS support node determines whether the identified terminal is currently attached. If so, the GPRS support node sends in a next step 108a a message indicating that the terminal shall be updated to the DCR (Device configuration register). If the terminal is currently not attached, the GPRS support node in a next step 1003 stores an indication, for example a flag, in order to make sure that the terminal will be configured at the next attachment.

FIG. 1b depicts a flowchart of a method for a serving GPRS support node.

In a first step 101, the serving GPRS support node receives a message that a terminal is detached or going to detach.

In a next step 102, the serving GPRS support node stores data describing mobility management and PDP (packet delivery protocol) context data for the terminal. In an embodiment of the invention, the data are stored for a predefined time value, only. In a further embodiment of the invention the data stored for at least some terminals are erased in the case that the number of terminals for which said data is stored is above a predefined threshold value.

In a further step 103, the serving GPRS support node receives an attach message from a terminal of a subscriber comprising at least an identification of the subscriber, for example an IMSI (International Mobile Subscriber Identity). The serving GPRS support node requests an identification of the terminal, for example an IMEI (International Mobile Equipment Identity) in a next step 104. This step 104 is performed only in the case that the identification of the terminal is not already available at the serving GPRS support node.

In a next step 105, the serving GPRS support node checks if an indication is stored that the terminal shall be configured. If said indication, for example a flag, is set, the serving GPRS support node sends in a step 107 a message to a DCR. If no indication is stored, the serving GPRS support node checks in a next step 106, whether the combination of subscriber identification and terminal identification is stored at the serving GPRS support node. If the combination is stored, the terminal will not be configured. If the combination is not yet stored, a notification is sent to a device configuration register in a further step 107 that the terminal has to be configured.

The message sent in step 107 comprises at least an identification of a subscriber, e.g. an IMSI, and an identification of a terminal, e.g. an IMEI. Furthermore it can comprise the following parameters related to the subscriber or the terminal: a cause flag, that is set by the serving GPRS support node and that indicates the reason for sending the message, at least one set of data relating to a PDP context as an identification of an access point, e.g. an APN (Access Point Name), a Quality of Service subscribed to, a PDP context identifier, a PDP type identification, a PDP address. The message may comprise data sets for a plurality of PDP contexts. It can be sent for example according to an IP (Internet Protocol) as a TCP (Transport Control Protocol) or a UDP (User Datagram Protocol) message.

FIG. 1c depicts a flowchart for a third method for a serving GPRS support node. The steps 101 and 102 are identical to the steps as described in FIG. 1a. In step 103a, a message is received that the terminal has attached or is attaching to a different serving GPRS support node. The GPRS support node deletes the data stored for the terminal in a next step 104a.

Figure 2:
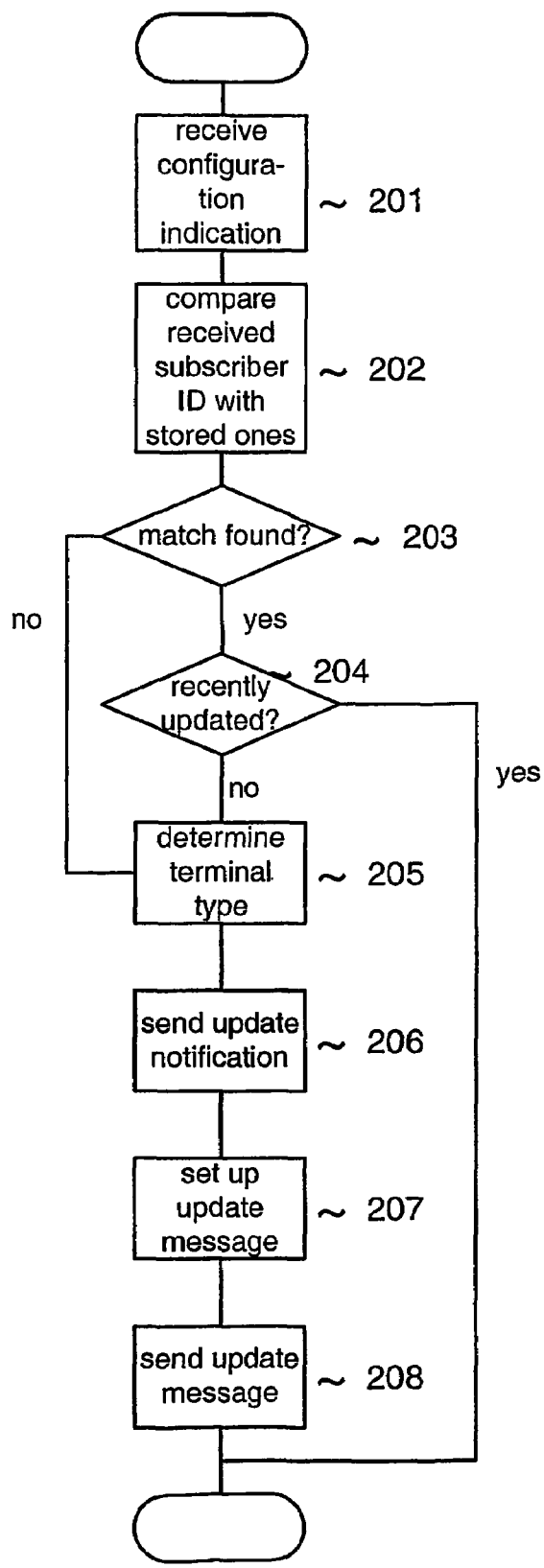
FIG. 2 depicts method for a device configuration register according to the invention.

FIG. 2 depicts a flowchart for a method for a DCR. In a first step 201 the device configuration register receives a message indicating that a terminal has to be configured. The message comprises at least an identification of a subscriber and an identification of a terminal. In a next step 202 the DCR checks if the identification of the subscriber matches with any stored subscriber identification in its database. If not matching subscriber identification is found the next step is step 205. If the received identification matches with a stored identification, the serving GPRS support node compares in a next step 204 the received combination of terminal and subscriber identification with combinations stored in sets of data in its database. If the received combination matches with a stored combination, the terminal is not updated. If the received combination does not match with any of the stored the serving GPRS support node continues with step 205.

In an embodiment of the invention, the device configuration register checks in step 204 additionally or exclusively if a terminal has been updated in a predefined time interval. If no update took place the DCR continues with step 205.

In step 205 the terminal type of the terminal is determined. In a first embodiment of the invention, a terminal type request is sent to the user of the terminal. The subscriber returns an identification of the terminal type of the terminal. If not, a terminal type is guessed. In a second embodiment of the invention, a terminal type can be derived from the identification of the terminal.

In a next step 206, a notification is sent to the terminal that an update message is going to be sent. This step is optional and need not be performed if for example the user of the terminal has been requested to send an identification of the terminal type.

In a further step 208 a configuration message is set up according to the terminal type of the terminal. This step can also be performed outside the DCR, as described for FIGS. 3a and 3b. The configuration message comprises configuration data for the terminal depending on the type of terminal.

In step 209 the configuration message is sent to the terminal. This step may be performed by another node, too.

In an embodiment of the invention the DCR stores the time when the configuration message has been set up or when the set up has been initiated.

In an embodiment of the invention, steps 202, 203, and 204 are not performed if the message received from the serving GPRS support node comprises a cause flag value that indicates that a change of subscriber data is the reason for the message. It that case the next step 205 is performed after step 201.

In the following the term home location register is used for any node that performs the storing a provision of a user profile, as for example an AAA (Authorisation Authentication Accounting) server or a home subscriber server. The SMS (Short Message Service) for sending messages has been chosen as a well-known example. Certainly every other service for sending messages to a subscriber or her/his terminal can be used as for example USSD (Unstructured Supplementary Service Data) and MMS (Multimedia Messaging Service). The service gateway SGOTA can be replaced by an OTA (Over The Air) server. Furthermore can the DCX and the service gateway be implemented in a single node. The DCX can also be placed in another already existing node. The IMSI and IMEI are just well known examples for subscriber identification or terminal identification. Any other identification can be used as well.

In an embodiment of the invention, roaming subscribers are not configured. Roaming subscribers can be identified by their IMSI and by home location register.

Figure 2A:
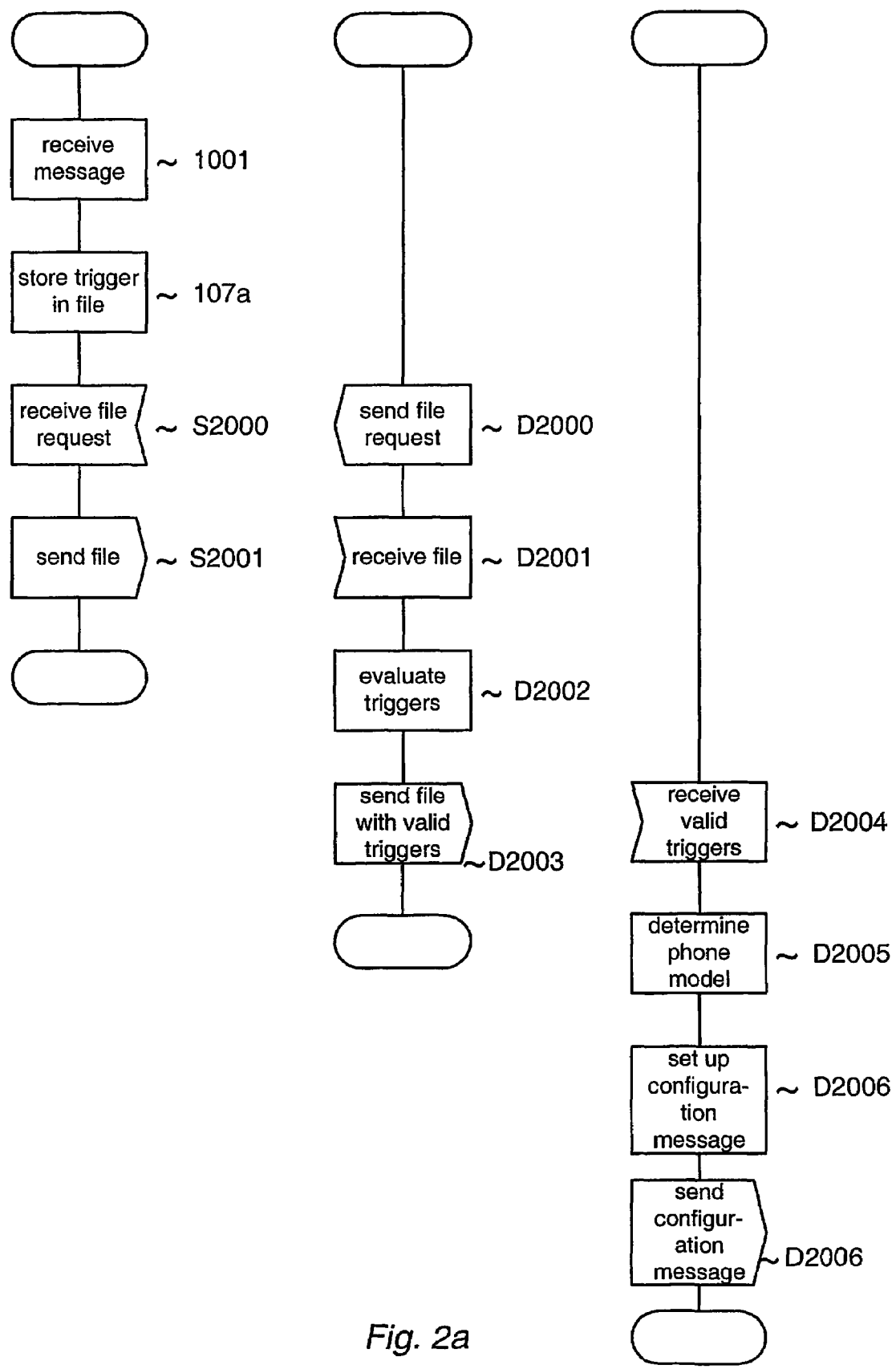
FIG. 2a depicts a further embodiment of the invention by an inter working between a serving GPRS support node, a device configuration register and a device management system.

FIG. 2a depicts a further embodiment of the invention. The serving GPRS support node receives the message in the step 1001 as described for FIG. 1a. Afterwards it stores a trigger for sending a configuration message for example in a file. The device configuration register requests the file in a step D2000, for example by using a file transfer protocol. The request may be sent at regular time intervals. The serving GPRS support node receives the request in a step S2000 and replies by sending the file in a next step S2001. The device configuration register receives the file in a next step D2001. It should be noted that the file transfer may be handled differently for example that the serving GPRS support node sends the file in regular time intervals or after storing a predefined number of triggers or a combination of both.

In a next step D2002 the device configuration register opens the file and evaluates the triggers stored in said file. In a next step D2003 it sends the evaluated triggers to a device configuration management system.

The device management system receives the triggers in a step D2004. It determines in a step D2005 the terminal type of a terminal for that a trigger was set. In a next step D2006 the device management system sets up a configuration message appropriate to the terminal type of the terminal and sends the configuration message to the terminal in a further step D2007. The split into device management system and device configuration register is optional as well as the decision which step is performed by which of them.

Figure 3A:
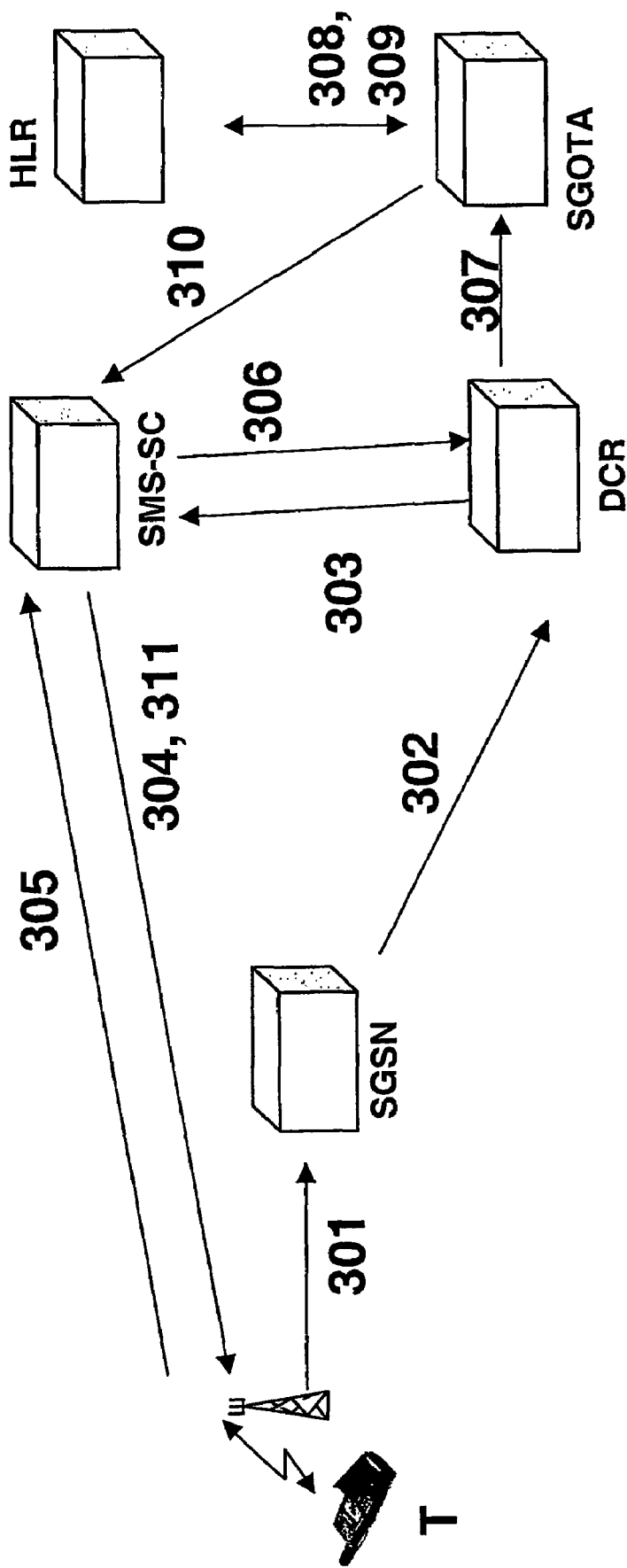
FIG. 3a depicts a configuring of a terminal according to the invention.
Figure 3B:
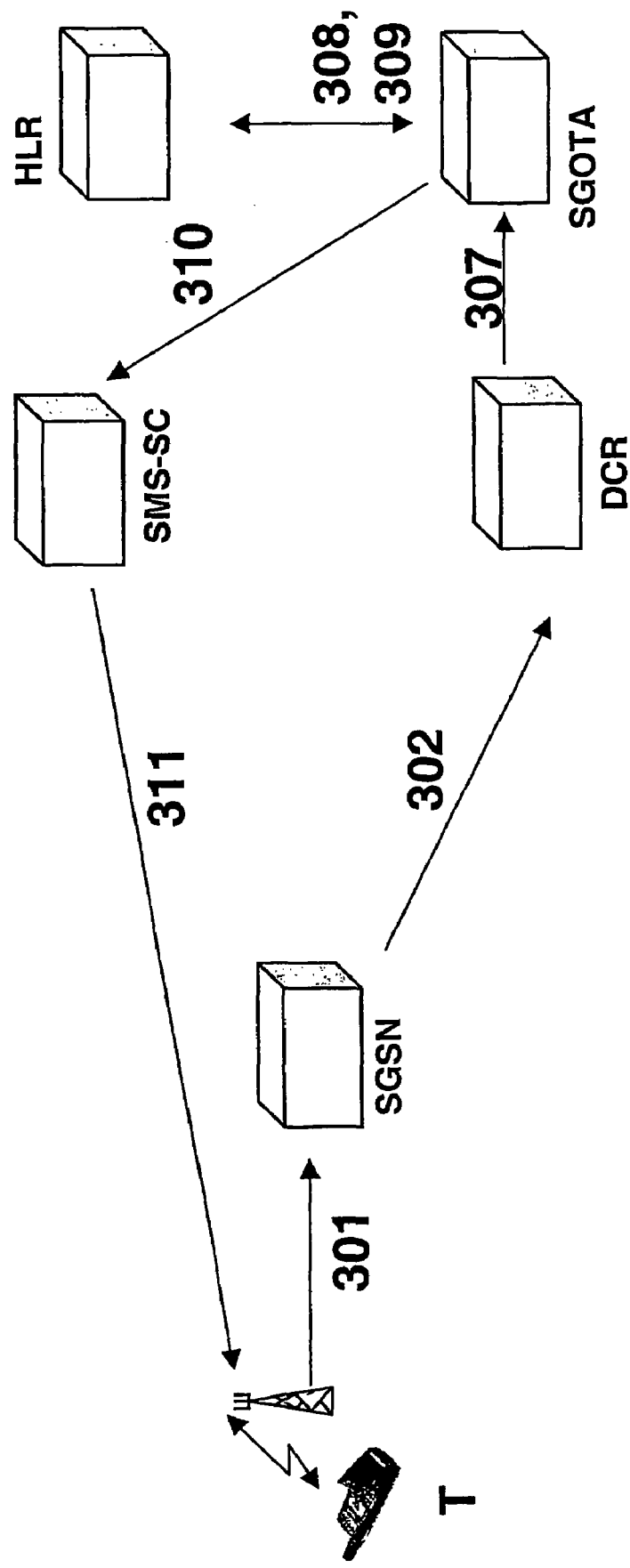
FIG. 3b depicts a further configuring of a terminal according to the invention.

FIGS. 3a and 3b depict a part of a telecommunications network that supports GPRS.

FIG. 3a depicts a configuring of a terminal according to the invention. The figure shows a terminal T that supports GPRS, a serving GPRS support node SGSN, a device configuration register DCR, a service gateway SGOTA, a home location register HLR, and a short message service service centre SMS-SC. In a first step 301 the terminal T sends an attachment message to the serving GPRS support node SGSN. The SGSN requests the IMEI from the terminal and detects that the combination of IMSI and IMEI is not yet stored at the serving GPRS support node SGSN. It sends a message indicating that the terminal has to be configured to the device configuration register DCR. The message comprises the IMEI, and the MSISDN (Mobile Station Integrated Services Digital Network number) of the terminal and the IMSI of the subscriber. The MSISDN is transmitted to simplify the transmission of a short message to the terminal. In a next step the device configuration register DCR determines the type of terminal that shall be updated. Therefore it sends in a next step 303 a short message requesting an identification of the terminal type to the terminal via the SMS (Short Message Service) Service centre SMS-SC. The message comprises the MSISDN of the terminal. The SMS service centre SMS-SC forwards the message in step 304 as a short message to the terminal T. The terminal returns the requested information in a message in a next step 304. The SMS service centre SMS-SC forwards the information in a next step 306 to the device configuration register DCR. If the request message is not answered or does not deliver the type of terminal, the device configuration register DCR guesses the terminal type. In a next step 307 the device configuration register DCR sends the terminal type identification to the service gateway SGOTA. I a next step 308 the service gateway SGOTA requests configuration information from the home location register HLR, which returns the requested information in a step 309 to the service gateway SGOTA. The steps 308 and 309 are optional. In a next step 310 the service gateway SGOTA sets up and sends a configuration message to the SMS service centre SMS-SC, which forwards it as a short message to the terminal T in a step 311.

It should be noted that the functionality of the service gateway SGOTA can be implemented in the device configuration register DCR, too. The steps 307, 308, and 310 are in that case performed by the device configuration register DCR. The messages sent to the SMS service centre SMS-SC comprise the MSISDN of the terminal and can be sent in a short message format or in any format the SMS service centre SMS-SC can convert into a short message.

FIG. 3b depicts an embodiment of the invention wherein the steps 303, 304, 305, and 306 are omitted. In the embodiment of FIG. 3b, the terminal type is either determined from the IMSI or by a qualified guess.

In an embodiment of the invention, a subscriber order gateway receives new configuration data for a subscriber. Said new configuration data are sent to a home location register. A notification of the new configuration data is sent to a GPRS support node, for example by the home location register. If the subscriber is currently attached, the indication is sent to its serving GPRS support node. The serving GPRS support node checks based on the data available at the serving GPRS support node whether the terminal has to be configured. If the terminal has to be configured, the serving GPRS support node performs the configuring of the subscriber's terminal by sending a message to the DCR as described above.

If the terminal is not currently attached, the indication is sent to a GPRS support node. The GPRS support node checks based on the data available whether the terminal has to be updated. If the terminal has to be updated an indication is stored in the GPRS support node that the terminal has to be updated. The further processing is already described by means of FIGS. 1a and 1b and FIGS. 3a and 3b.

The invention also relates to software that is adapted to control a serving GPRS support node or a device configuration register in a way that they perform the steps of the methods as described by means of FIGS. 1a, 1b, and 1c, or 2 respectively.

Figure 4:
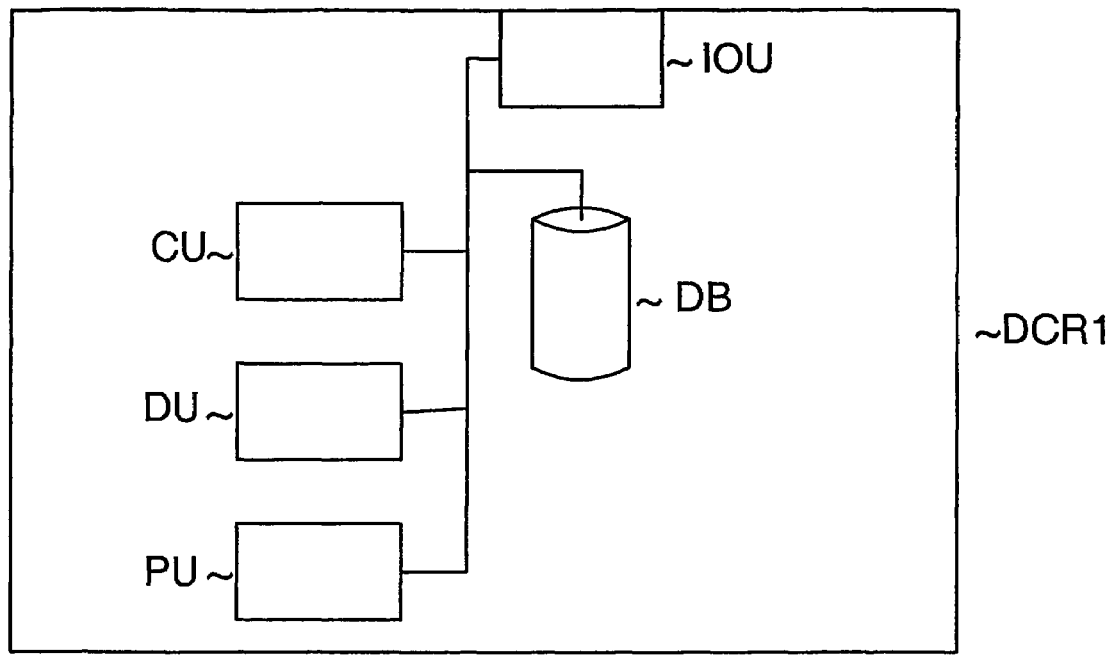
FIG. 4 depicts a device configuration register according to the invention.

FIG. 4 depicts a device configuration register DCR1 according to the invention. It comprises a an input/output unit IOU for sending and receiving messages, a database DB for storing data sets comprising at least an identification of a subscriber and an identification of a terminal. The device configuration register DCR1 further comprises a comparing unit CU for comparing combinations of an identification of a subscriber and an identification of a terminal received with combinations stored in the sets of the database, and a determining unit DU for determining a terminal type of a terminal and a processing unit PU for controlling the device configuration register. The processing unit PU is adapted setting up a configuration message. The units can be implemented by means of software or hardware modules or a combination of both. The database stores sets of data comprising at least an identification of a terminal and an identification of a subscriber. It can further comprise a terminal type identification and configuration data. The contents of the data base can be entered by an operator or set up during operation of the data base by storing new combinations of data sent to the data base in a set of data.

Figure 5:
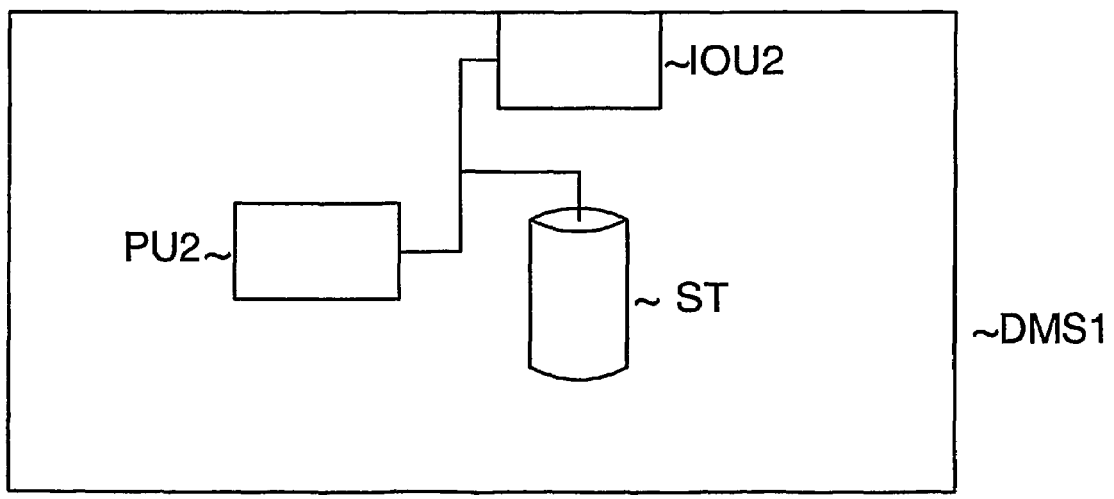
FIG. 5 depicts a device management system according to the invention

FIG. 5 depicts a device management system according to the invention. It comprises an input/output unit IOU2 for receiving from a configuration register at least one terminal identification together with a trigger to update a terminal configuration of the terminal. The receiving from the terminal can be executed for example as described for FIG. 2a. The input/output unit IOU2 is connected to a processing unit PU2 and a storage ST comprising an allocation of terminal identifications to terminal types. The processing unit PU2 is used for controlling the node, setting up a configuration message, and sending the configuration message to the terminal. The units can be implemented by means of software or hardware modules or a combination of both. The storage ST can store sets of data comprising at least an identification of a terminal allocated to a terminal type identification and configuration data. The contents of the storage can be entered for example by an operator or set up during operation of the storage by storing new combinations of data sent to the storage in a set of data.

The invention claimed is:

1. A method for configuring a terminal for a telecommunication network that supports a General Packet Radio Service, comprising the steps of:
   receiving from a serving general packet radio service support node a message, wherein the message comprises at least an identification of the terminal and of a subscriber using the terminal;
   comparing the received combination of subscriber identification and terminal identification with combinations stored in a database;
   determining that the received combination of subscriber and terminal identification is not stored in the database;
   determining the type of the terminal from a plurality of types, wherein each type correlates to a group of terminals configurable with identical configuration settings;
   setting up or initiating the selling up of a configuration message according to the terminal type of the terminal; and
   sending or initiating the sending of the configuration message to the terminal, said configuration message containing settings to enable said terminal to access said General Packet Radio Service.

2. The method according to claim 1, wherein the steps are performed by a device configuration register.

3. The method according to claim 1, wherein the configuring message is sent via a short message service or a multi media message service.

4. A method for configuring a terminal for a telecommunication network that supports a General Packet Radio Service, comprising the steps of:
   receiving from a serving general packet radio service support node a message, wherein the message comprises at least an identification of the terminal and of a subscriber using the terminal;
   determining that the terminal has not been updated within a predefined time interval;
   determining the type of the terminal from a plurality of types, wherein each type correlates to a group of terminals configurable with identical configuration settings;
   setting up or initiating the setting up of a configuration message according to the terminal type of the terminal; and
   sending or initiating the sending of the configuration message to the terminal, said configuration message containing settings to enable said terminal to access said General Packet Radio Service.

5. A method for configuring a terminal for a telecommunication network that supports a General Packet Radio Service, wherein a serving General Packet Radio Service support node performs the steps of:

receiving from a terminal an attachment message, wherein the message comprises at least an identification of a subscriber using the terminal;

comparing the combination of subscriber identification and terminal identification with combinations stored in the serving General Packet Radio Service support node;

determining that the combination of subscriber and terminal identification is not stored; and sending a message to a device configuration register wherein the message comprises at least an identification of the terminal and at least an identification of the subscriber; and, receiving a detachment message from the terminal and storing mobility management data and packet delivery protocol context data are performed before the receiving of an attachment message.

6. The method according to claim 5, wherein the additional step of storing in a trigger storing file a trigger for updating a configuration of the terminal used by said subscriber is performed before sending the message and wherein the message comprises said trigger storing file.

* * * * *

UNITED STATES PATENT AND TRADEMARK OFFICE
CERTIFICATE OF CORRECTION

| | | |
|---|---|---|
| PATENT NO. | : 7,580,367 B2 | |
| APPLICATION NO. | : 10/513236 | |
| DATED | : August 25, 2009 | |
| INVENTOR(S) | : Bleckert et al. | |

It is certified that error appears in the above-identified patent and that said Letters Patent is hereby corrected as shown below:

On the Title Page, Item (57) under "ABSTRACT", Line 1, delete "devices" and insert -- device --, therefor.

In Column 6, Line 39, in Claim 1, delete "selling" and insert -- setting --, therefor.

Signed and Sealed this

Twenty-fourth Day of November, 2009

David J. Kappos
*Director of the United States Patent and Trademark Office*